No. 638,038. Patented Nov. 28, 1899.
H. BLUMENBERG, Jr. & F. C. OVERBURY.
PRIMARY BATTERY.
(Application filed Dec. 12, 1898.)
(No Model.)
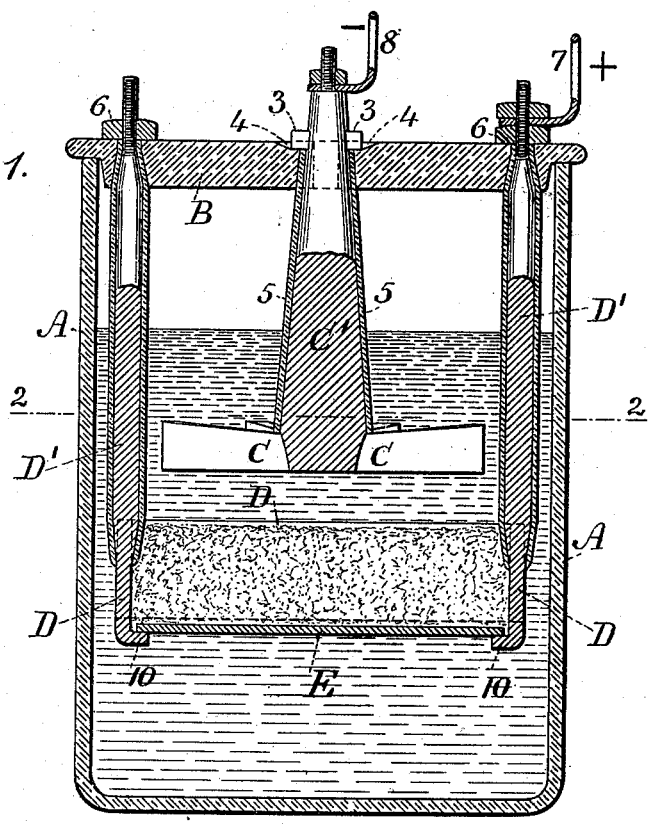
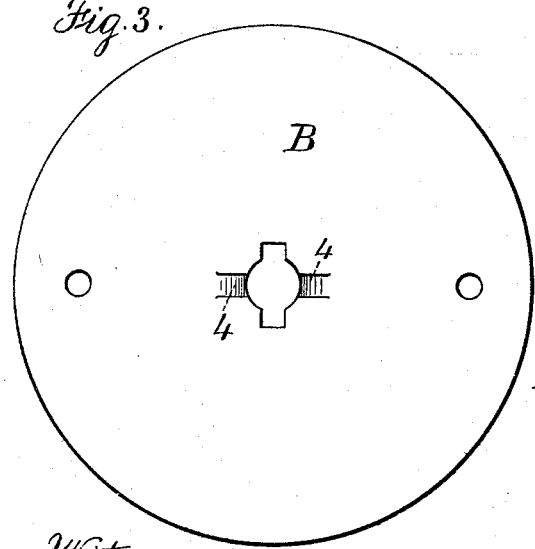
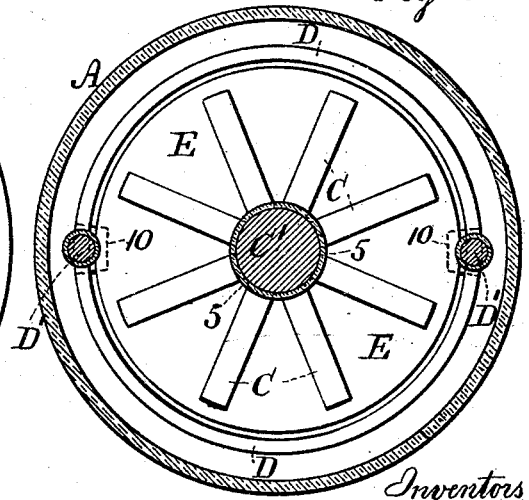
Witnesses
J. Staib
Chas H. Smith
Inventors
Henry Blumenberg Jr.
Frederick C. Overbury
per L. W. Purell & Son attys.

UNITED STATES PATENT OFFICE.

HENRY BLUMENBERG, JR., AND FREDERICK C. OVERBURY, OF NEW YORK, N. Y.

PRIMARY BATTERY.

SPECIFICATION forming part of Letters Patent No. 638,038, dated November 28, 1899.

Application filed December 12, 1898. Serial No. 698,953. (No model.)

*To all whom it may concern:*

Be it known that we, HENRY BLUMENBERG, Jr., residing at New York, (Wakefield,) in the borough of Bronx, county of Westchester, and FREDERICK C. OVERBURY, residing at the city of New York, county of New York, State of New York, both citizens of the United States, have invented an Improvement in Primary Batteries, of which the following is a specification.

In primary batteries it is common to suspend the zinc in a jar and within the electrolytic liquid and to place the copper element in the bottom of the jar. The cells, however, are not uniform in their action, because the distance between one electrode and the other varies considerably, according to the amount of material placed in the bottom of the jar, and also in consequence of the glass jars being of different heights.

In addition to the foregoing it is difficult to clean out the battery-cell and recharge the same, because the salts or other materials made use of frequently become conglomerated or in a rigid mass at the bottom of the electrolytic solution and the glass jar is frequently broken in the removal of these materials, and, in addition to this, considerable time is consumed in recharging the cell and the hands of the operator are often injured by the materials employed. This is especially the case where caustic potash is made use of and copper oxids.

The object of the present invention is to insure uniformity of distance between the respective electrodes in order that the battery may not have an unnecessary resistance in one or more cells and also to provide for the removal with rapidity of the spent materials, so as to clean the cell and recharge it.

In carrying out our invention we employ a cover to the cell, which can easily be removed, and suspend both the electrodes from the cover, the positive electrode being of any desired character, and the other electrode, having negative material, is in the form of a cup for the reception of such material, with a movable bottom, so that the spent materials at the positive pole of the battery can be easily removed by opening the bottom of the cup, and then by replacing the bottom in position the cup can be filled with the copper oxids in a ground form or other material and the cover replaced on the cell containing the fresh electrolytic liquid and the cell is ready for use.

In the drawings, Figure 1 is a vertical section; Fig. 2, a plan in section at the line 2 2, and Fig. 3 is a plan view of the cover.

The cell A is preferably of glass or other suitable vitrified material and of the proper size and the cover B is of non-conducting material and preferably vitrified, and we find it advantageous to employ earthenware for this cover, and this cover is adapted to rest upon the top edge of the cell A, and it has through it holes for the reception of the other parts, as hereinafter described.

The zinc element C is of any desired size or shape, and it has a stem C' passing through the central hole in the cover B, and there are lugs 3 projecting at opposite sides of the stem, the cover B being notched at the central hole, as represented at Fig. 3, for the free passage of the lugs 3, and the zinc receives about a quarter-turn after the stem C' has been passed through the cover B in order that the lugs 3 may be received into recesses 4 for suspending the zinc electrode from the cover; but it can be removed with facility by giving the zinc a quarter-turn. It is advantageous to place a tube 5, of rubber or similar material, around the stem C' to shield the same from the action of the electrolytic liquid.

The arms that extend out from the stem C' and form the zinc electrode are made to slope upward, so that the outer ends are higher than the junction of the arms with the stem. By this construction we find that by placing a drop of mercury upon the arm at or near its junction with the stem C' such mercury will not roll off; but it will gradually amalgamate the entire surface of the arm where such arm is in a clean condition. Hence by this construction the amalgamation of the zinc electrode is facilitated.

The cup D is preferably cylindrical and made without a bottom, and it is suspended by the rods or bars D', that pass up from it and through holes in the cover B, and the upper ends of the rods D' are screw-threaded for the nuts 6 or otherwise provided with suspending devices, so that the cup D and rods D' are suspended from the cover B, and the clamping devices for the wires 7 and 8 may be of any desired character. We have represented such wires as clamped between the nuts upon one of the rods D' and upon the stem C'.

A movable bottom E is provided for the cup D, so that when this bottom is in place copper oxids or any other suitable material can be retained in the cup, and by moving the bottom E such material can be discharged from the cup when spent or when the cell is to be recharged.

The connection between the movable bottom E and the cup D may be of any desired character. We have represented inwardly-projecting lugs or fingers 10 to form rests, upon which the opposite edges of the bottom E rest when the bottom is in place, and by moving the bottom laterally it can be slipped off these lugs or rests, so that such bottom may fall away with the contents of the cup or to give access for the removal of such contents, and the bottom E can be easily replaced, so that the copper oxids, sulfate of copper, or other material used in connection with the battery-electrode can be supplied into the cup, and by leveling this material off to the height of the top edge of the cup a uniform distance can be obtained between the electrodes in all the cells of the battery, and hence the electrolytic solution will act with uniformity in all such cells, and there will be no material differences in the resistances in the cells, and the difficulty heretofore experienced in consequence of different resistances in the different cells will be avoided.

The zinc electrode Z can be used in this battery for one of the poles and copper oxid in the cup for the other pole; but we do not limit ourselves to the substance made use of.

We claim as our invention—

1. The combination with the battery-cell and its cover, of suspending-rods connected at their upper ends to the cover, a cup having side portions permanently secured to the suspending-rods and a separate bottom removable from the cup whereby the depolarizing material can be discharged downwardly by removing the bottom without disturbing the connections of the cup to the cover, substantially as set forth.

2. The combination with the battery-cell and its cover, of suspending-rods provided with fingers and connected at their upper ends to the cover, a cup at the lower ends of the suspending-rods and a removable bottom to the cup resting upon the fingers and from which cup the bottom can be separated for the discharge of the depolarizing material, substantially as set forth.

3. The combination with the battery-cell and its cover, of two suspending-rods permanently fastened at their upper ends to the cover and having projections at their lower ends, and a cup with a bottom resting upon the projections and removable from the same for emptying the depolarizing material without separating the suspending-rods from the cover, substantially as specified.

4. The combination in a battery-cell with the removable cover, of a centrally-supported electrode and a cup below the same for holding depolarizing material and supports extending from the same to the cover at opposite sides of the centrally-supported electrode, the bottom of the cup being removable for the discharge of the depolarizing material, substantially as set forth.

5. The combination in a battery-cell with the removable cover, of a centrally-supported electrode and a cup below the same for holding depolarizing material and supports extending from the same to the cover at opposite sides of the centrally-supported electrode, a laterally-removable bottom and fingers for supporting the same whereby the depolarizing material can be discharged downwardly by the removal of the bottom, substantially as set forth.

Signed by us this 9th day of December, 1898.

HENRY BLUMENBERG, JR.
FREDK. C. OVERBURY.

Witnesses:
GEO. T. PINCKNEY,
S. T. HAVILAND.